United States Patent Office 3,394,721
Patented July 30, 1968

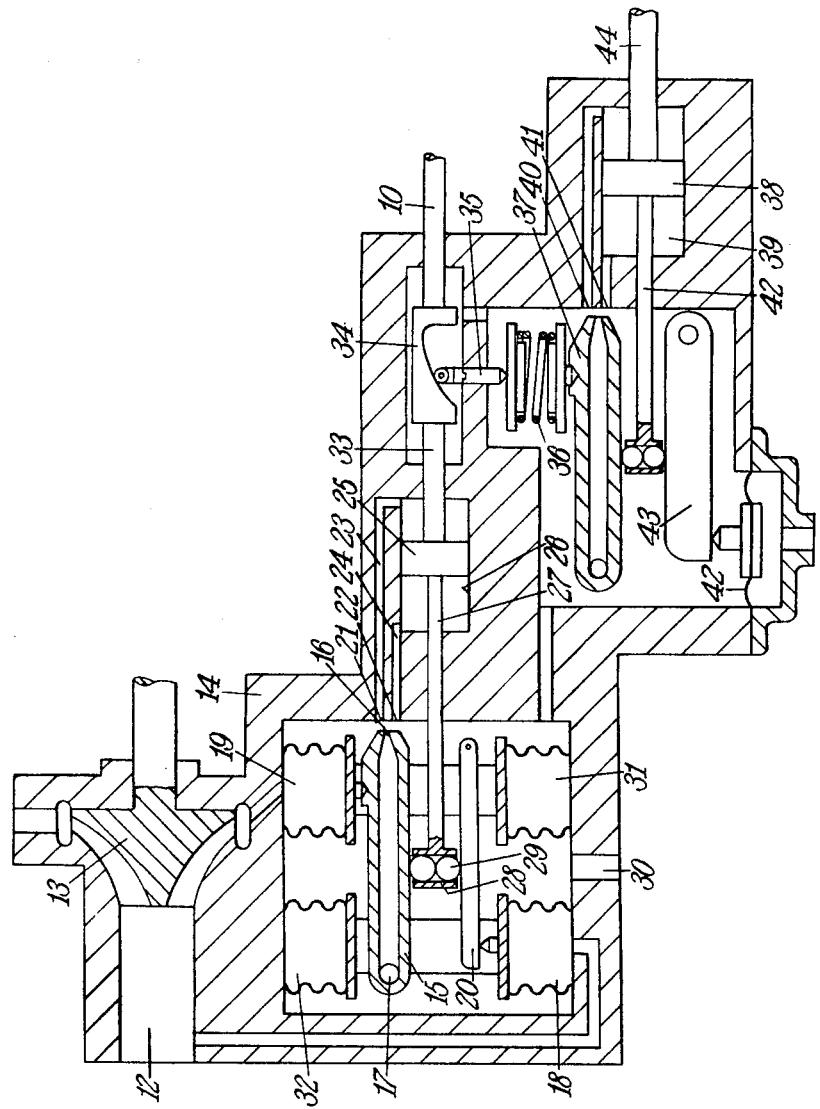

3,394,721
CONTROL MEANS FOR VARYING THE POSITION OF A MEMBER IN RESPONSE TO CHANGES IN THE RATIO OF TWO PRESSURES
Richard Joseph Ifield, Beecroft, New South Wales, Australia, assignor to Joseph Lucas (Industries) Limited, Birmingham, England
Filed Mar. 29, 1966, Ser. No. 538,363
4 Claims. (Cl. 137—37)

This invention has for its object to provide in a convenient form, control means for varying the position of a member in response to changes in the ratio of two fluid pressures.

According to the present invention control means for varying the position of a member in response to changes in the ratio of two fluid pressures comprises in combination, a body part, a hollow lever pivotally mounted in the body part, means for supplying fluid under pressure to the interior of the lever which has an outlet at a position remote from its pivot, two fluid pressure responsive devices arranged to translate the two fluid pressures respectively into forces acting in opposite directions to move the lever angularly about its pivot, the body part having a pair of orifices to receive fluid under pressure from the outlet of the hollow lever, in proportions dependent upon the angular position of the lever, and means responsive to differential pressures at said orifices for varying the leverage which one of said pressure responsive devices exerts on the hollow lever, said means being operatively connected to the member.

The inventon will now be described by way of example with reference to the accompanying drawing which is a generally diagrammatic representation of a control means within this invention.

In this example, there is provided a control means for varying the position of a member indicated as being connected to a rod 10, in response to changes in the ratio of two air pressures, one of which is the pressure in the air intake nozzle indicated at 12, of a gas turbine engine and the other of which is the pressure on the downstream side of a compressor 13 driven by the engine and disposed in the intake 12. The rod 10, is in this example, connected to an operating mechanism for varying the geometry of an intake nozzle on an aircraft gas turbine engine installation. It is to be understood, however, that the invention is not limited to such use.

The control means comprises a body part 14 within which is pivotally mounted a hollow lever 15, having an outlet 16 at its end remote from its pivot. The hollow lever 15 is arranged to be supplied with fluid under pressure from any convenient source through a passage 17. The body part 14 also contains two pressure responsive devices in the form of expandible capsules 18, 19, to the interior of which are admitted the air pressure in the intake nozzle 12, and the pressure at the downstream side of the compressor 13 respectively.

One of the capsules 19 acts directly on the hollow lever 15 and the other capsule 18 acts in opposition to the first mentioned capsule 19 through a second lever 20 pivotally mounted in the body part 14 and through a means for varying the leverage which that capsule 18 exerts on the hollow lever 15, (this means being more fully described later).

In the wall of the body part 14, adjacent to the outlet 16 of the hollow lever 15, are two orifices 21, 22, these orifices being in communication, through respective passages 23, 24 with opposite sides of a piston 25 in a cylinder 26. This piston 25 forms part of the means for varying the leverage of the capsule 18 on the hollow lever 15, this means also including a piston rod 27 extending into the interior of the body part 14 and movable in a line parallel with the normal longitudinal axis of the hollow lever 15. This piston rod 27 carries a transverse tube 28 containing a pair of rollers 29 extending from opposite ends of the tube 28 respectively into contact with the hollow lever 15 and with the second lever 20. Movement of the piston 25 therefore varies the leverage of the capsule 18 on the hollow lever 15.

The body part also includes an outlet opening 30 through which fluid leaving the hollow lever 15 and failing to pass through either orifice 21 and 22 can escape. Furthermore, there are two further capsules 31 and 32 which are evacuated and which act in opposition to one another to maintain a minimum force on the pressure responsive capsules 18 and 19 so that when the pressure in the latter capsules drops below a predetermined value, the hollow lever 15 is still subjected to a force tending to maintain its mid-way position.

Connected to the piston 25 is a further piston rod 33 which is connected to the rod 10, which is, in turn, connected to mechanism for varying the engine air intake nozzle as previously referred to.

In operation, any change in the ratio of the intake pressure (which can be written as $P_1$) and the pressure on the downstream side of the compressor (which can be written as $P_2$), causes angular movement of the hollow lever 15, thus permitting a greater proportion of the fluid leaving the outlet 16 to pass through one of the orifices 21 and 22 then passes through the other. This causes a differential pressure on opposite sides of the piston 25 thus causing it to move and vary the leverage of the capsule 18 on the hollow lever 15. The arrangement is such that this movement tends to cause movement of the hollow lever 15 in the opposite direction, thus a balance position is found for any given ratio of the two pressures. Piston movement is transmitted to the rod 10 and thus to the engine air intake nozzle or other mechanism, as the case may be. This movement may be a mechanical movement or any other form of signal, as convenient.

Thus the nozzle (or other mechanism) is controlled in response to changes in the ratio of the pressures which may be written $P_2/P_1$. Since $P_2$ is directly proportional to engine speed N, (since the compressor is engine driven) then it can be shown that $P_2/P_1$ is equal to $N/\sqrt{T_2}$ where $T_1$ is the ambient temperature.

This value $N/\sqrt{T_1}$ has been found to be convenient but can be modified in the following way to give a signal of a value proportional to $T_1$ alone. To modify the $N/\sqrt{T_1}$ signal, the piston rod 33 is provided with a cam 34 against the surface of which a spring loaded cam follower 35 engages, the configuration of the cam converting the $N/\sqrt{T_1}$ signal into $N_2/T_1$. The spring 36 abuts against a second hollow lever 37 in an extension of the body part 14 and a similar piston 38 and cylinder 39, supplied through two orifices 40, 41 has a piston rod 42 extending into the interior of the body part extension to vary the leverage of a pressure responsive device, which may take the form of a capsule or a diaphragm 42, on the further hollow lever 37 through a lever 43. To the interior of the space enclosed by the diaphragm 42 is admitted a fluid pressure proportional to $N^2$. A rod 44 connected to the piston 38 is movable to give a signal proportional to $T_1$. Where the last mentioned signal is utilised, there would normally be no need for the $N/\sqrt{T_1}$ signal to be used and vice versa.

It is to be understood that instead of the air pressures, other gas or liquid pressures may be used where these are appropriate. The control means itself may be modified by replacing the pressure capsules by other suitable pressure responsive devices and the piston and cylinder may be replaced by an equivalent device such as a diaphragm in a suitable chamber.

Having thus described my invention what I claim as new and desire to secure by Letters Patent is:

1. Control means for varying the position of a member in response to changes in the ratio of two fluid pressures comprising, in combination, a body part, a hollow lever pivotally mounted in the body part, means for supplying fluid under pressure to the interior of the lever which has an outlet at a position remote from its pivot, two fluid pressure responsive devices arranged to translate the two fluid pressures respectively into forces acting in opposite directions to move the lever angularly about its pivot, the body part having a pair of orifices to receive fluid under pressure from the outlet of the hollow lever, in proportions dependent upon the angular position of the lever, and means responsive to differential pressures at said orifices for varying the leverage which one of said pressure responsive devices exerts on the hollow lever, said means being operatively connected to the member.

2. Control means according to claim 1 in which the pressure responsive devices are in the form of capsules to the interior of which fluid under pressure can be admitted to cause the capsules to exert mechanical forces with changes in the fluid pressures.

3. Control means according to claim 1 in which the means responsive to differential pressures at said orifices comprises a piston in a cylinder, with opposite ends of which the orifices are respectively in communication, the member being connected to the piston for movement therewith, and the piston also carrying a rod, the position of which varies said leverage.

4. Control means according to claim 1 in which the movement of the member can be used to transmit a signal proportional to another parameter to apparatus to be controlled, said movement of the member actuating cam means for varying the position of a further hollow lever, the latter being also influenced in the opposite direction by a further fluid pressure responsive device and means responsive to the differential pressure in two orifices arranged to receive fluid from the outlet of the further hollow lever, for varying the leverage which said further pressure responsive device exerts on said further hollow lever, said means being arranged to provide said signal.

References Cited

UNITED STATES PATENTS

| | | | |
|---|---|---|---|
| 2,858,700 | 11/1958 | Rose | 137—37 X |
| 3,233,522 | 2/1966 | Stern | 137—36 X |
| 3,277,911 | 10/1966 | Dakin | 137—36 X |

CLARENCE R. GORDON, *Primary Examiner.*